United States Patent [19]
Taylor

[11] 3,791,815
[45] Feb. 12, 1974

[54] PROCESS FOR LANTHANIDE AND ACTINIDE METALS ORE REDUCTION

[76] Inventor: Paul Franklin Taylor, P.O. Box 468, Crossville, Tenn. 38555

[22] Filed: Dec. 13, 1972

[21] Appl. No.: 314,809

[52] U.S. Cl. ............... 75/84.1 R, 75/84, 75/101 R, 75/108, 252/301.1 R, 423/18, 423/19, 423/20, 423/21
[51] Int. Cl. ....................... C22c 59/00, C22c 61/04
[58] Field of Search .................. 423/18, 19, 20, 21; 252/301.1 R; 75/84, 84.1 R, 101, 108

[56] References Cited
UNITED STATES PATENTS
2,866,680  12/1958  Long ..................................... 423/18
2,859,092  11/1958  Bailes et al. ........................... 423/18

Primary Examiner—Benjamin R. Padgett
Assistant Examiner—B. Hunt

[57] ABSTRACT

The Lanthanide and Actinide series of metals are found mainly in the three ores Monazite, Carnotite, and Uraninite or Pitchblende. In winning these metals from the ores usually the oxides are separated either seperately or in groups first, then the oxides are reduced either separately or in groups, thereby providing individual metals, or an alloy known as a commercially designated Misch metal. Such separations and reductions apply to only the ores as found natural and does not include the manmade nuclear transformation elements of the series. The separations and reductions both from the ores, the oxides, and the Misch metal are quite complicated, cumbersome, costly, and at times are inefficient. By application of the instant process such ores and oxides may be reduced in either of those forms in a more simple manner to either the individual metals or the alloy. The alloy metal may then be subsequently separated into individual metals at great savings in operations and cost in comparison to that which is known. The ores or oxides are subjected to a certain liquid formula solution, such material being finely pulverized, by mixing together within a suitable container, followed by additions of pulverized limestone and stirred while the reaction goes to completion. The liquid formula is comprised of phosphoric acid, zinc oxide, and an alkylphenol polyglycol ether type sulfated surfactant. The mixture is heated within the container by an endothermic heat source until the ore has been digested by the liquid formula solution with the consequent release of gases and expanded in volume to a dry, spongelike state. In this condition the material is considered as being "fixed" for smelting. Upon smelting the material releases the metal which forms into ingot-like masses at the bottom of the furnace as reduced and smelted metal. The combination of reduction ingredients are effective, therefore, in liberating the metals from chemically bound oxygen and other impurities upon heating the mixture and then smelting the residue.

3 Claims, No Drawings

PROCESS FOR LANTHANIDE AND ACTINIDE METALS ORE REDUCTION

Therefore, the present process relates to an improved method of separating the Lanthanide and Actinide series of metals from chemically combined oxygen and other impurities; more specifically termed reduction of the oxides and ores in which the metals exist as parts; such separating herein known as LANTHANIDE AND ACTINIDE METALS ORE REDUCTION.

As starting materials for this process finely pulverized Lanthanide and/or Actinide metal ore or their oxides are mixed with a certain liquid chemical solution. Finely pulverized calcium carbonate ($CaCO_3$) is added. The ore is of the following types or the material from which the metallic oxides are derived; Monazite, Carnotite and Uraninite or Pitchblende. The liquid formula chemical solution is of the following composition (by weight ratio);

| Phosphoric acid | 24.20 No. more or less |
|---|---|
| Zinc Oxide | 0.50 No. more or less |
| Sulfated Surfactant | 1.00 No. more or less |

The sulfated surfactant is a type of wetting agent and of composition alkylphenol polyglycol ether. The powdered calcium carbonate ($CaCO_3$) should be at least 99 percent pure.

When the selected ore material and other starting materials are mixed together within a common container and heated with endothermic heat, oxygen and other impurities separate from the metals and form into chemical union with the liquid chemical solution formula and calcium oxide of the limestone, part of which is expelled in the form of gases. The metals are then smelted out to ingot form from the residue material.

It is, therefore, an object of the present invention process to provide another method for the production of Lanthanide and Actinide metals.

It is another object of the present invention process to provide a method for producing those metals by utilizing either the ores or the oxides derived therefrom with the process, and subsequent smelting.

It is a further object of the present invention process to provide a more simple and economical manner for producing these metals.

Other objects and advantages of the present invention process will become apparent from a further reading of the description and the appended claims.

With the above and other objects in view, the present invention process mainly comprises a process for separating the Lanthanide and Actinide series of metals from chemically combined oxygen and other impurities, featuring ease of reduction operations, and one that is economically advantageous.

The process begins with the stated mixing together of the starting materials in a suitable pot or vat, followed by stirring until the visible chemical reaction is completed and the oxide impurities brought into solution.

The pot or vat is then placed within a suitable furnace arrangement where effective heat may be applied to it.

The solution with the ore is then boiled with heat until sufficient liquid has digested the ore with the release of some gases. The boiling is attended and enhanced by frequent stirrings with a suitable agitator. It is also attended by such mechanical arrangements as necessary for the collecting and venting of gases.

The temperature operation range throughout the boiling period is that which is necessary for maintaining a gentle rolling boil. Heating is terminated when residue has baked to a dry and expanded solid state.

The resulting residue may then be smelted and/or refined by conventional means to produce Lanthanide and Actinide series metal. For that operation residue is pulverized to necessary chunk sizes to suit the furnace smelting technique requirements.

OPERATIONAL EXAMPLE

The operation for Lanthanide and Actinide metal ore reduction as derived from the foregoing specification may be exemplified more particularly by an explanation for the reduction of seventy grams of commercially pure thorium dioxide ($ThO_2$) which the inventor has operated successfully. The oxide is as fine or finer than $-325$ mesh.

The reduction equipment consists of the following: A silicon heat resisting non-corroding pint crucible, a non-corroding stirring rod, and an appropiate gas-type or electric heat source.

Introduced within the crucible are the seventy grams of the thorium dioxide, or one volume measure, two volume measures of the above described liquid chemical solution formula known as Taylor formula, such solution being comprised of ingredients as described, and one-eighth volume measure of limestone of approximately $-100$ mesh in particle size, the limestone being at least 99 percent pure calcium carbonate ($CaCO_3$). The dioxide, solution formula and limestone are thoroughly stirred and mixed until the visible reaction of the release of gases has terminated.

With the crucible resting on the gas-type or electric heat source gentle heat is applied until boiling commences. The heat is then regulated so that a very gentle rolling boil continues. A proper vent is required for the outgassing fumes. The boiling is continued until the residue is baked to a dry solid state. During boiling the mixture is stirred as often as necessary to maintain a homogeneous state.

Upon termination of boiling the residue is allowed to cool and then removed and pulverized as necessary for entry into the smelting and/or refining furnace.

A second operational example utilizing Monazite ore of a pure concentrated form and pulverized to $-325$ mesh is conducted exactly as the above example except the one volume measure of the ore weighs 82 grams instead of the seventy of the thorium dioxide, and serves as an example in reason for mixing the various ores and oxides with solution and limestone by volume measurement instead of by weight measurement, with heavier pulverized ore not requiring more or less solution and limestone than the thorium dioxide example for the necessary reduction, and such also is true with lighter ores. Thus, the necessary ore, solution and limestone ratios are more important relative to volume measurement than by weight, and so the above example ratios present a norm in the reduction of the Lanthanide and Actinide concentrated ores or the oxides derived from them, but is not intended to mean the reduction effectiveness for these metal series is confined to an exact and definite ratio either by weight or by volume, as different mesh sizes of both the ore, their oxides and the limestone changes the weights while the volumes remain constant.

What is claimed as new and desired to be secured by Letters Patent is:

1. A method of reducing Lanthanide and Actinide series metal ore or the oxide derived from them to ingot or alloy forms comprising the steps of:
   A. Adding powdered Lanthanide and Actinide series metal ore or the oxides derived from them to a solution consisting essentially of about 24.2 parts by weight of phosphoric acid, about 0.5 parts by weight of zinc oxide, and about 1.0 part by weight of a sulfated surfactant,
   B. Dissolving one-eighth volume of pulverized calcium carbonate ($CaCO_3$) to approximately one volume of Lanthanide and Actinide series metal ore or the oxides derived from them.
   C. Bringing the mixture to a boil while stirring to obtain a homogeneous solution,
   D. Vaporizing the volatile materials until residue is baked to a dry solid state,
   E. Smelting the remaining residue to produce Lanthanide and Actinide series metal ingots or alloy.

2. The process of claim number one wherein the Lanthanide and Actinide series metal ore is in the form of Monazite, Carnotite, and Uraninite or Pitchblende, or the oxides derived from them.

3. The process of claim number one wherein the sulfated surfactant is an alkylphenol polyglycol ether.

* * * * *